Figure 1A:
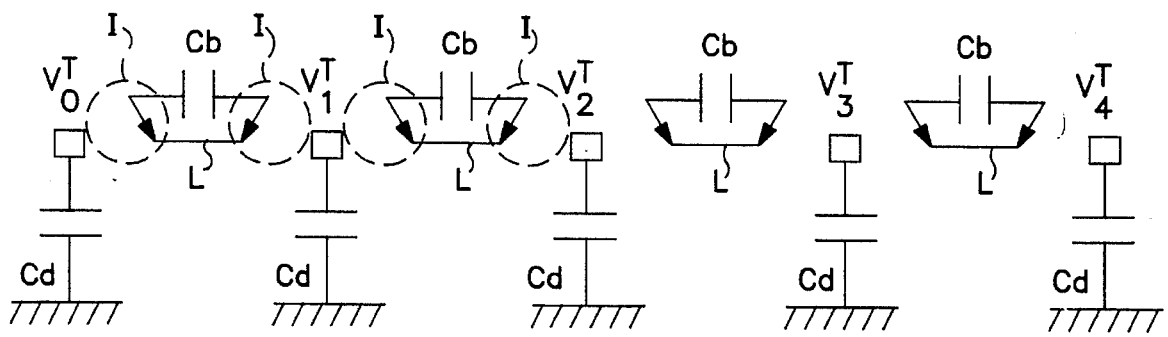

United States Patent [19]
Ni et al.

[11] Patent Number: 5,521,857
[45] Date of Patent: May 28, 1996

[54] PROCESS AND DEVICE FOR THE ANALOG CONVOLUTION OF IMAGES

[75] Inventors: Yang Ni, Les Ulis; Francis Devos, La Ville Du Bois; both of France

[73] Assignees: France Telecom; Centre National de la Recherche Scientifique (CNRS), both of Paris, France

[21] Appl. No.: 166,650

[22] Filed: Dec. 14, 1993

[30] Foreign Application Priority Data

Dec. 15, 1992 [FR] France .................................. 92 15093

[51] Int. Cl.⁶ .................................................. G06G 7/12
[52] U.S. Cl. ............................................ 364/820; 364/819
[58] Field of Search .................................... 364/819, 820

[56] References Cited

U.S. PATENT DOCUMENTS 4,555,770  11/1985  Saga .
4,956,564  9/1990  Holler et al. .

FOREIGN PATENT DOCUMENTS 2656185  6/1991  France .

OTHER PUBLICATIONS

IEEE Proceedings on the International Symposium on Circuits and Systems, vol. 2, Jun. 1988, Espoo, Fin, pp. 1217–1220, Bernard et al.

Primary Examiner—Tan V. Mai
Attorney, Agent, or Firm—Blakely, Sokoloff, Taylor & Zafman

[57] ABSTRACT

A process and device for the analog convolution of images, especially two-dimensional convolution operations of Gaussian type on a set of image pixels represented by voltages. The voltages are applied to a first set of capacitors. For each capacitor, one terminal is connected to a reference voltage; the other terminal is part of a network of nodes, each of which is insulated from the others. The nodes which are adjacent are connected together for a predetermined duration via a second set of uncharged capacitors. The nodes of the network are then insulated from each other again and the second set of capacitors are discharged. The steps of connecting the nodes together, insulating them from each other, and discharging the second set are repeated. Finally, the new voltages on the nodes of the network, which represent the pixels of a convolved image, are read out.

8 Claims, 4 Drawing Sheets

PROCESS AND DEVICE FOR THE ANALOG CONVOLUTION OF IMAGES

The present invention relates in general to image convolution, and relates in particular to a novel recursive process making it possible to carry out by successive iterations an analog convolution of an image represented by a plurality of analog voltages delivered by a plurality of elementary sensors arranged in a network, with an impulse response of Gaussian type.

The Gaussian filtering of images offers numerous practical applications, especially in the field of artificial vision.

Such filtering in fact exhibits a certain number of interesting mathematical properties such as scalability and optimal spatio-temporal location.

For further details on Gaussian filtering refer to the work by D. Marr "Vision", published by Freeman, San Francisco, United Stated, 1982.

One method which comes within the scope of those skilled in the art for carrying out such Gaussian filtering consists in performing an analog/digital conversion on the various elementary voltages of the image sensors, and in then applying a Gaussian convolution kernel to the stored voltages, through numerical computation. Such numerical processing is however extremely lengthy and never compatible with real-time processing of moving images.

To overcome this disadvantage of numerical solutions, it has already been attempted to carry out Gaussian filtering of analog type in parallel on the sensor voltages themselves.

A first known solution of this type consists in installing, in association with a network, especially two-dimensional, of sensors, a resistive network, each resistance connecting two adjacent nodes of the sensor network in each direction of the network. The document "Robot Vision", by B. K. P. Horn, published by MIT Press, Cambridge, Mass., United States, 1986, elaborates upon a resistive network of this type.

However, such a resistive filter provides a response of exponential type which proves to be ill suited to certain problems of low level vision. In particular, the impulse response displays a non-differentiable central peak which limits the downstream processing operations.

Other authors have proposed the cascading of several resistive networks, with a view to obtaining a response which more or less approximates to a Gaussian. This method is however difficult to put into practice since it demands analog components, in particular amplifiers, with extremely tight specifications.

Another known technique consists in using, in association with a network of analog sensors, an RC network in which the voltages accumulated in the sensors are applied to the terminals of capacitors and in which resistances connect the adjacent nodes in the direction or directions of the network. The thesis by T. Knight "Design of an integrated optical sensor with on-chip preprocessing", PhD. Thesis, Department of Electrical Eng. and Computer Science, MIT, Cambridge, Mass., United States, elaborates upon a filter of this type.

The problem of this known circuit lies in the fact that the variance of the Gaussian kernel obtained grows extremely rapidly, since the values of the resistances, produced on a semiconductor substrate, are necessarily low. Thus, to obtain a satisfactory Gaussian response (of sufficiently low and precisely determined variance), it is necessary to carry out the sampling of the voltages over the network after an extremely precise short duration has elapsed, this proving to be difficult to carry out in practice.

Finally, another solution known in the field of analog convolvers lies in a binomial convolver as described in particular in the document by C. Koch, "An Introduction to Neural and Electronic Networks", Resistive Networks for Computer Vision, published by S. F. Zornetzer, J. C. Davis & C. Lau, Academic Press, 1989. Such a circuit employs the partial transfer of charges to the various nodes of the sensor through a judicious distribution of electrodes.

However, such a circuit has the disadvantage of not readily processing a two-dimensional image: indeed, it necessitates firstly carrying out the convolution along one of the axes, then storing the result in an analog memory independent of the sensor itself, and finally in carrying out the convolution along the other axis.

It is also difficult with this binomial convolver to obtain a Gaussian with reasonably low variance. Finally and above all, the convolver produced by this technique is not recursive and leads therefore to unwanted phenomena of spectral aliasing.

The present invention aims to overcome these disadvantages of the prior art.

To this end, it proposes a process for performing recursive especially two-dimensional convolution operations of Gaussian type on a set of pixels of an image, each pixel being represented by an electrical voltage, characterized in that it comprises the following steps:

a) the said electrical voltages are applied to the terminals of a plurality of first capacitors, first terminals of which are connected to a reference potential and second terminals of which constitute a plurality of nodes of a network and are electrically insulated from one another, b) the nodes which are immediately adjacent in the direction or directions of the network are connected together for a predetermined duration, via second, uncharged, capacitors, c) the nodes of the network are insulated from one another anew and the second capacitors are discharged, d) steps b) and c) are repeated, and e) the new electrical voltages which are present at the nodes of the network and are representative of the pixels of a convolved image are read out.

The invention also relates to a device for implementing the process as defined above, characterized in that it comprises, in combination:

a network of first capacitors, a first terminal of which is connected to a common reference potential and a second terminal of which is able to receive an electrical voltage representative of an image pixel, a set of second capacitors respectively associated with each adjacent pair, according to the direction or directions of the network, of first capacitors, controlled interrupter means capable, for a first predetermined period, of joining up the terminals of each second capacitor to the second terminals of the associated pair of first capacitors and, for a second predetermined period following on from the first, of insulating the said second terminals from the associated pair of first capacitors and of short-circuiting together the terminals of each second capacitor.

A convolution is thus effected, the response of which may be very close to a Gaussian, with means which are technically simple and easy to put in place in a very large scale integration semiconductor circuit. A recursive convolution is also effected which, by choosing the number of iterations, allows very precise control of the variance.

The convolver according to the present invention exhibits the property of solving the heat equation, the impulse response of which may be regarded as Gaussian, once the dimension or dimensions of the network are sufficiently large and once the number of iterations is sufficient.

Figure 2A:
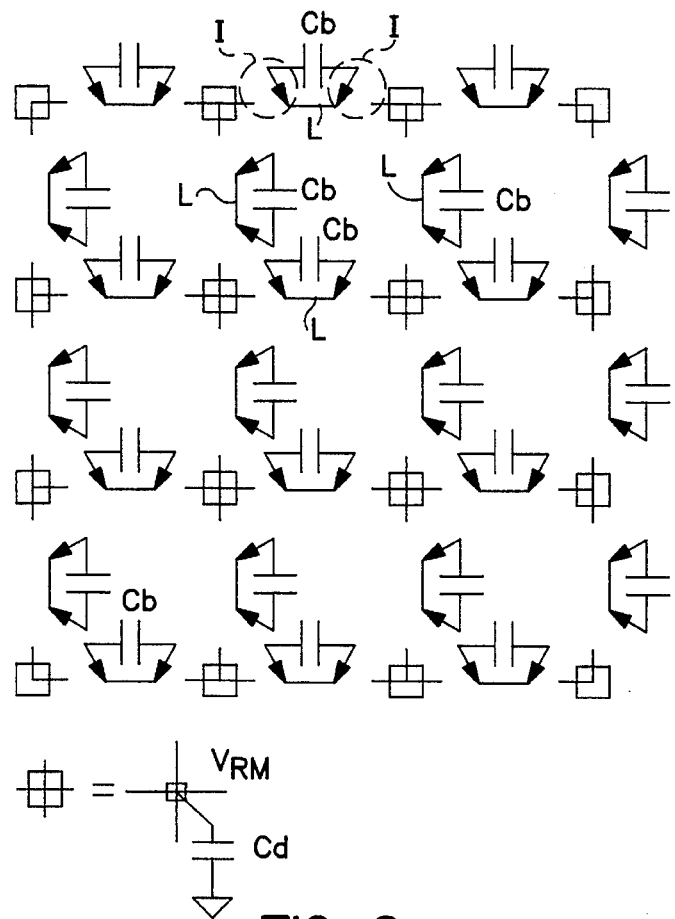
Figure 2B:
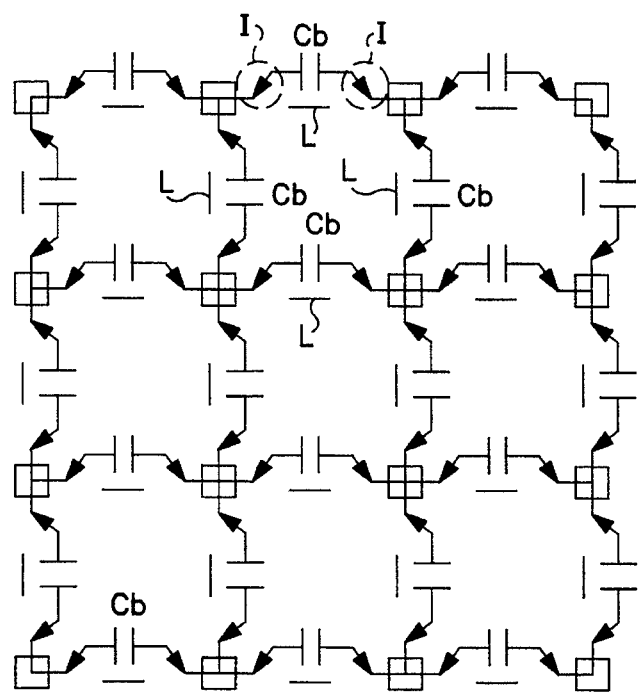
Figure 3:
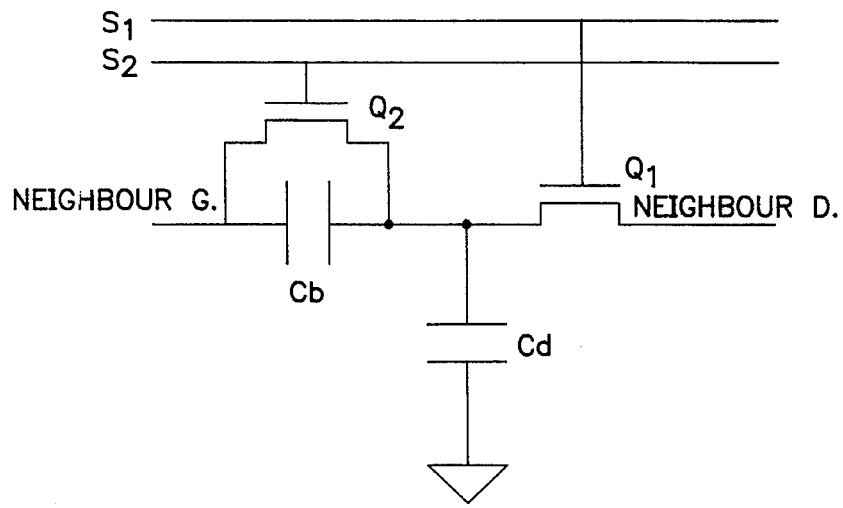
Figure 4:
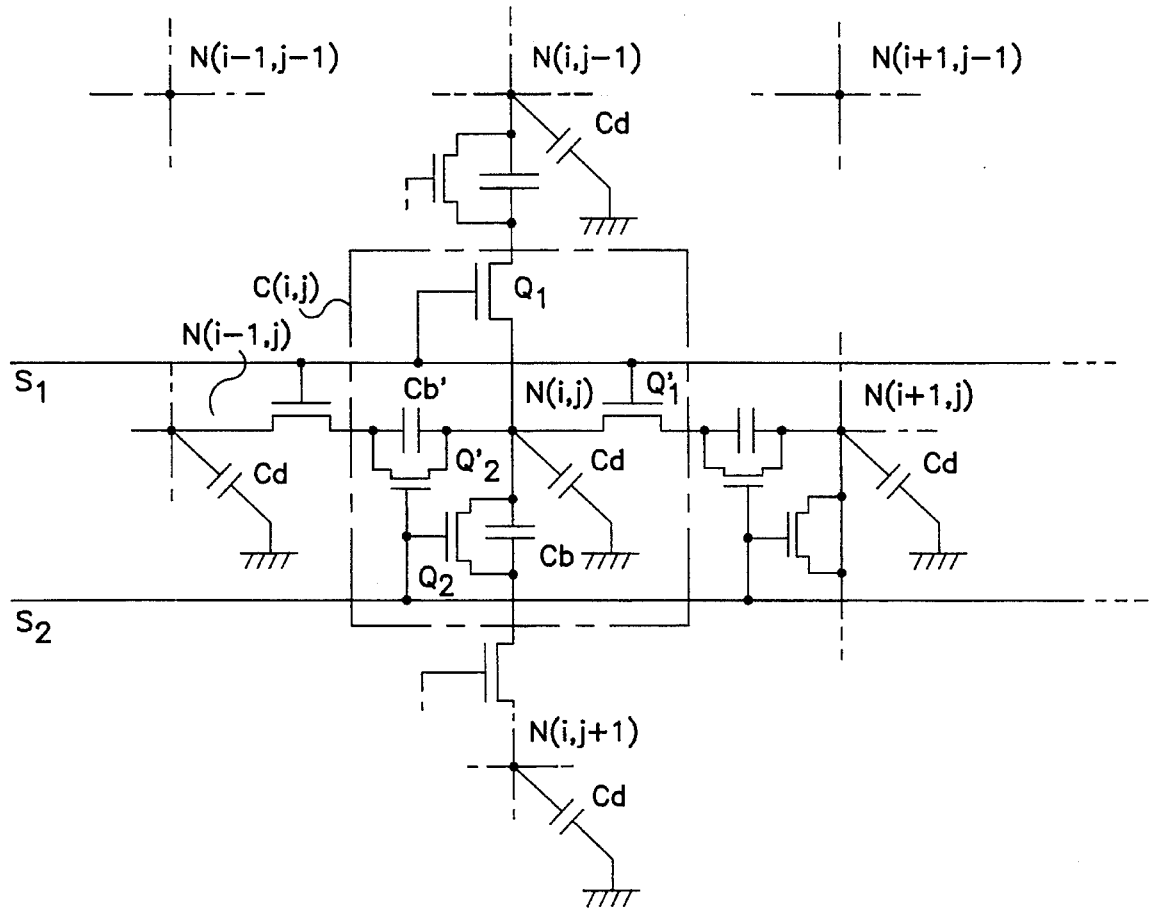
Figure 5:
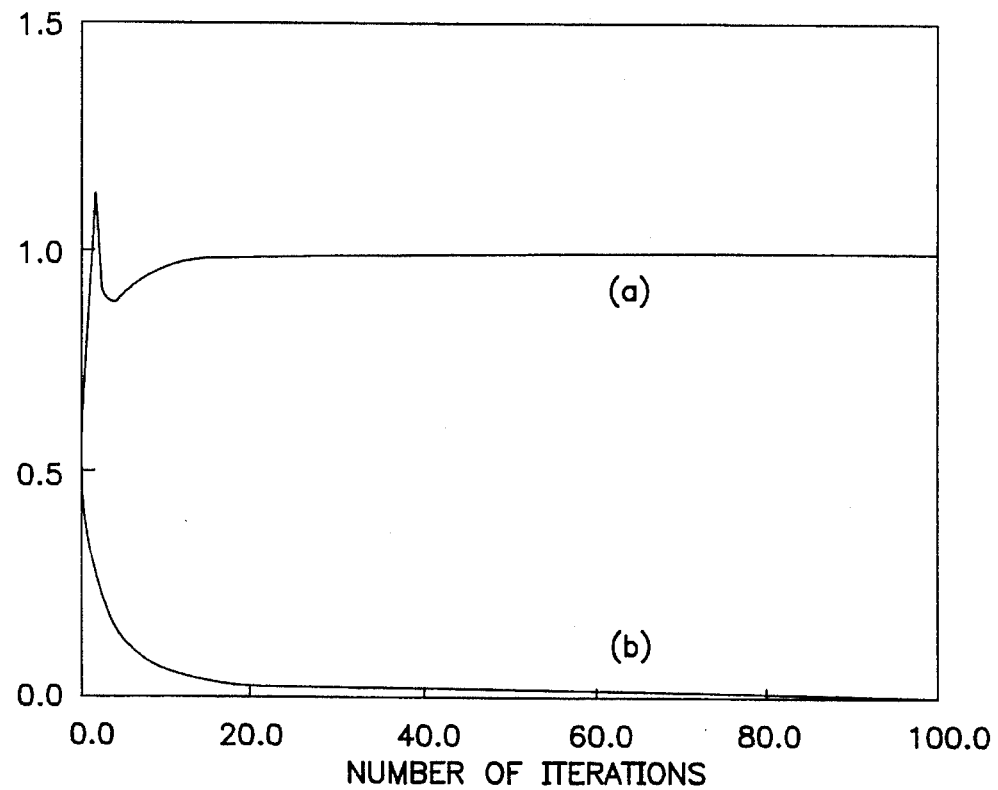
Figure 6:
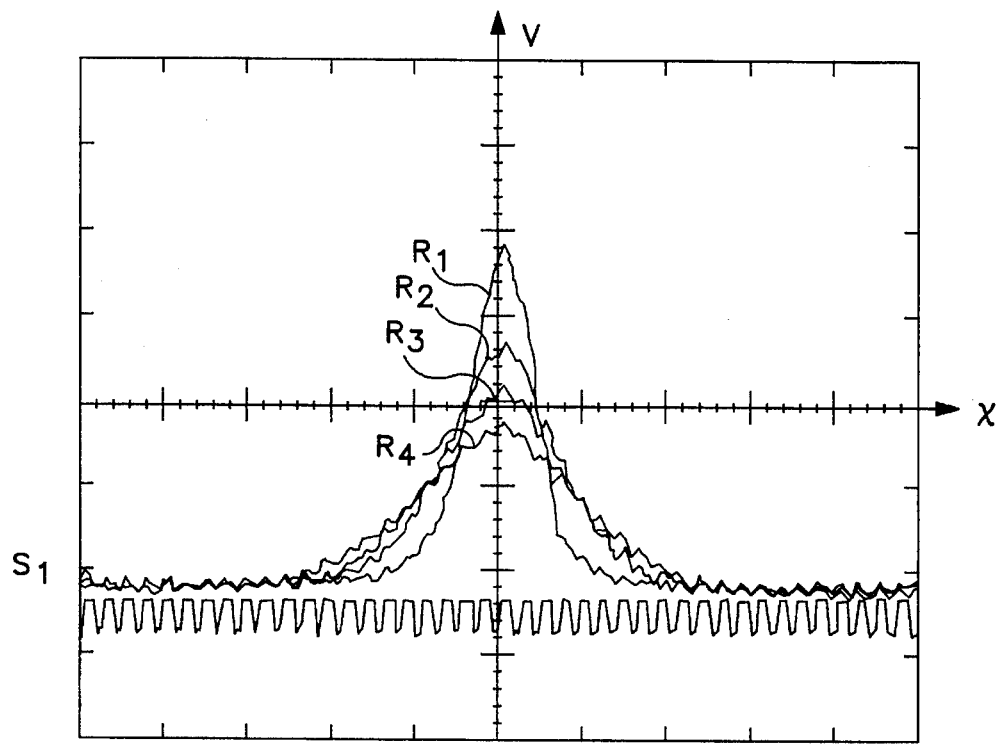

Other aspects, objectives and advantages of the present invention will emerge better from reading the following detailed description of preferred embodiments thereof, given by way of example and made with reference to the attached drawings in which:

FIGS. 1a an 1b represent a circuit for one-dimensional analog convolution according to the present invention, in two different states, FIGS. 2a and 2b represent a circuit for two-dimensional analog convolution according to the present invention, in two different states, FIG. 3 represents a cell of a circuit for one-dimensional analog convolution according to a specific embodiment of the present invention, FIG. 4 represents a cell of a circuit for two-dimensional analog convolution according to a specific embodiment of the present invention, FIG. 5 indicates graphically some characteristics of the response obtained as compared with a perfect Gaussian, and FIG. 6 indicates graphically a plurality of responses obtained, as a function of the number of iterations carried out.

It will be noted as a preliminary that, from one figure to another, identical or similar elements or parts are denoted as far as possible with the same reference signs.

Figure 1B:
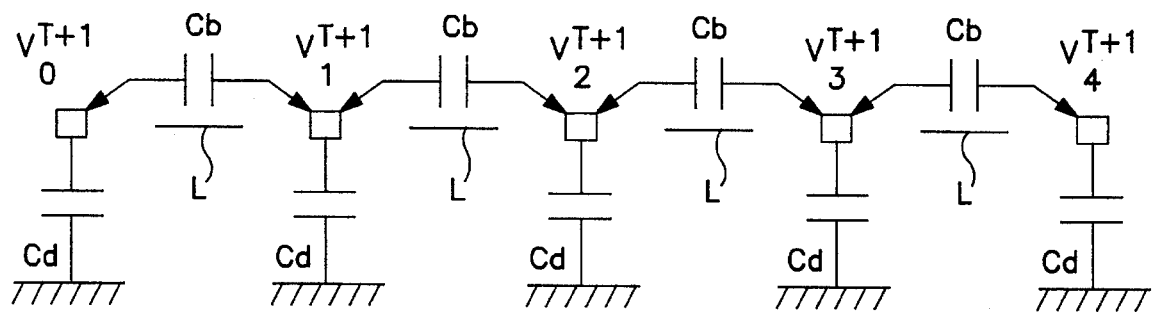

With reference firstly to FIGS. 1a and 1b, represented is a one-dimensional network which comprises a plurality of so-called horizontal capacitances Cb and a plurality of so-called vertical capacitances Cd. First terminals of the capacitances Cd are all connected to a reference potential, in particular to earth.

It is assumed here that the capacitances Cd exhibit at their terminals, at a first instant T, differing analog voltages denoted $V_O^T$ to $V_N^T$.

Each horizontal capacitance Cb extends between the second terminals of two adjacent vertical capacitances. A plurality of two-position switches I are provided respectively between each terminal of a horizontal capacitance Cb and each second, adjacent terminal of a vertical capacitance Cd.

Under the action of appropriate control pulses, the switches I can take either the position illustrated in FIG. 1a, or the position illustrated in FIG. 1b.

The behaviour of the circuit of FIGS. 1a is as follows: when quiescent (FIG. 1a), the second terminals of the vertical capacitances Cd are insulated, and the voltages $V_O^T$ to $V_N^T$ are preserved. The switches I receive control voltages which place them in the illustrated position. In this position, short-circuiting links L provided in association with each horizontal capacitance ensure the complete discharging, by way of the two adjacent switches I, of the said horizontal capacitances.

At a specified instant and for a specified duration, a control signal is applied simultaneously to the switches I so as to toggle them into the position illustrated in FIG. 1b. In this state, the charges held in the vertical capacitances tend to equilibrate, so that the voltages are diffused into the network, according to an exponential law, towards the neighbouring vertical capacitances through the horizontal capacitances, and the voltages $V_O^T$ to $V_N^T$ vary progressively.

When, at the instant T+1, the switches I revert to the position of FIG. 1a new voltages $V_O^{T+1}$ to $V_N^{T+1}$ are present on the vertical capacitances, and these voltages are then preserved, whilst the set of horizontal capacitances are short-circuited around themselves so as to dispel the charges acquired during the diffusion.

Next, new iterations are carried out as described above, in order to make the voltages over the network vary anew.

It will be noted that the diffusion length of the voltages $V_O^T$ to $V_N^T$ is conditioned by the ratio of the values of the capacitances Cb and Cd, in a manner analogous to a resistive analog network.

It will be observed that the capacitances Cb simply play the role of charge transfer paths in the network, and that after a complete cycle as described above, the sum of the charges in these capacitances is zero, so that the initial charge, stored in the set of capacitances Cd, is preserved. Specifically, this means that the surface area of the convolution kernel produced with the aid of this network remains unitary regardless of the number of iterations. Such a property is vital especially in a particular application of the invention, namely filtering of DOX type (difference between Gaussians).

It will furthermore be noted that the above capacitive network constitutes a linear system, which may thus be fully characterized by its impulse response.

There follows a proof of how, after a sufficient number of iterations, the response of the network represented in FIGS. 1a and 1b can be equated, to a very good approximation, to a Gaussian.

With the voltage at a node of the network being denoted $V_n^T$, equation (1) below, based on the principle of the conservation of charge, can be written down for each node:

$$C_d V_n^{T+1} + C_b(V_n^{T+1} - V_{n-1}^{T+1}) + C_b(V_n^{T+1} - V_{n+1}^{T+1}) = C_d V_n^T \quad (1)$$

This same equation can be expressed in the following form:

$$(V_{n-1}^{T+1} + V_{n+1}^{T+1} - 2V_n^{T+1}) = \frac{C_d}{C_b}(V_n^{T+1} - V_n^T) \quad (2)$$

The heat equation being the following:

$$\frac{\partial^2 V}{\partial x^2} = D \frac{\partial V}{\partial t} \quad D = \frac{C_d}{C_b} \quad (3a)$$

we observe that equation (2) is an implicit finite difference approximation of the heat equation (3a) in which the diffusion coefficient D would be equal to the ratio of the values of the capacitances Cd and Cb.

The impulse response of equation (3a) is as is well known a Gaussian whose variance is given by:

$$\sigma^2 = \frac{2t}{D} \quad (3b)$$

Mathematically, the finite difference equation (2) above is absolutely stable, that is to say the truncation error tends to zero as the number of iterations increases.

It is therefore proven that the capacitive network of FIGS. 1a and 1b will provide a Gaussian kernel of high quality once the number of iterations is sufficiently large. It could be proved by computation that the error between the response of the heat equation and the response actually obtained is of the order of 5% for ten iterations.

Illustrated in FIGS. 2a and 2b is a network analogous to that of FIGS. 1a and 1b, but two-dimensional.

The meaning of the symbol present at each node of the network is indicated in the bottom left of FIG. 2a.

The horizontal and vertical capacitances, the short-circuiting links and the controlled switches are denoted by the same references.

The operation is entirely analogous to that of the circuit of FIGS. 1a and 1b, except that the diffusion of the voltages to the nodes occurs, during the phases illustrated by FIG. 2, in both directions of the network.

If $V_{n,m}^T$ denotes the voltage of the node with coordinates (n, m), a conservation of charge equation analogous to equation (1) indicated above may be written down. This is equation (4) below:

$$C_d V_{n,m}^{T+1} + C_b(V_{n,m}^{T+1} - V_{n-1,m}^{T+1}) + C_b(V_{n,m}^{T+1} - V_{n+1,m}^{T+1}) \quad (4)$$
$$+ C_b(V_{n,m}^{T+1} - V_{n,m-1}^{T+1}) + C_b(V_{n,m}^{T+1} - V_{n,m+1}^{T+1})$$
$$= C_d V_n$$

As in the previous case, this equation is an implicit finite difference approximation of the heat equation, but over a two-dimensional surface. The heat equation in two dimensions is as follows:

$$D\left( \frac{\partial^2 V}{\partial x^2} + \frac{\partial^2 V}{\partial y^2} \right) = \frac{\partial V}{\partial t} \quad D = \frac{C_b}{C_d} \quad (5)$$

As in the case of the one-dimensional network, the finite difference equation (4) above is absolutely stable, that is to say the truncation error tends to zero as the number of iterations increases.

It is therefore likewise proven that the capacitive network of FIGS. 2a and 2b will provide a Gaussian kernel of high quality once the number of iterations is sufficiently large.

The minimum number of iterations to achieve this quality can be determined by numerical computation. In this regard, FIG. 5 of the drawings shows in its top part (curve (a)) the variance of the response computed as a function of the number of iterations, and in its bottom part (curve (b)) the accumulated error between the computed variance presented in curve (a) and the theoretical variance deduced from equation (4), after normalization.

It is observed in FIG. 5 that, once the number of iterations exceeds twenty (namely twice that in the case of a one-dimensional network), the error is reduced to less than 5%. Thus, for twenty iterations and more, the variance of the impulse response actually obtained can be regarded, to a good approximation, as the theoretical variance deduced from the heat equation (5).

One possible specific embodiment of a cell of a one-dimensional capacitive network using C-MOS technology will now be described with reference to FIG. 3.

The first terminal of the vertical capacitance Cd is connected to earth, whilst its second terminal is connected on the one hand to the neighbouring cell located immediately to the east by way of a MOS transistor Q1, and on the other hand to a first terminal of a parallel arrangement of a horizontal capacitance Cb and another MOS transistor Q2. The second terminal of this parallel arrangement is connected to the neighbouring cell located immediately to the west.

The grid of Q1 is connected to a bus conveying a control signal S1 consisting of a string of pulses at specified frequency. The grid of Q2 is connected to a bus conveying a control signal S2 consisting of a string of pulses of like frequency, interposed temporally between the pulses of the signal S1.

The quiescent phase is defined by the periods for which the signal S1 delivers no pulse. All the transistors Q1 are disabled and the nodes of the network are insulated from one another.

During at least some of these periods, a pulse is provided by the signal S2 to each transistor Q2, which saturates and short-circuits the terminals of the associated capacitor Cb, so as to discharge it completely.

In the voltage diffusion phase, each transistor Q2 is disabled whilst each transistor Q1 is saturated for a certain duration. A charge transfer path is thus produced between the neighbouring nodes, via the capacitors Cb.

The circuit of FIG. 4 illustrates the embodying of a two-dimensional capacitive network with C-MOS technology.

Each cell C(i,j) of the network comprises one node N(i,j) of the network, and the associated vertical capacitance Cd between this node and earth.

The MOS transistors Q1 and Q1' connect the node N(i,j) respectively to the cell associated with node N(i,j−1) located immediately to the north, and to the cell associated with node N(i+1,j) located immediately to the east.

Node N(i,j) is furthermore connected to the cell associated with node N(i,j+1) located immediately to the south via the parallel arrangement of a horizontal capacitance Cb and a MOS transistor Q2, and to the cell associated with node N(i−1,j) located immediately to the west via the parallel arrangement of another horizontal capacitance Cb and a MOS transistor Q2'.

The transistors Q1 and Q1' are controlled by the pulse signal S1, whilst the transistors Q2 and Q2' are controlled by the pulse signal S2.

Operation is similar to that of the circuit of FIG. 3, except that the voltages diffuse simultaneously in both directions of the network.

It will be observed here that, in the specific embodiments of FIGS. 3 and 4, the number of necessary switching elements is minimized.

It will furthermore be noted that the loading of the initial voltages to be convolved onto the various nodes of the network can be performed by any conventional switching technique. Similarly, the tapping off of the new post-iteration voltages may be carried out by appropriate switching techniques.

However, mention will be made here of the case in which the source of the images consists of a matrix of photodiodes constituting a MOS imager.

In this case, the vertical capacitances Cd are replaced by the photodiodes themselves, whose junction capacitance is sufficient for them to play, after exposure to photons, the same role as the said vertical capacitances.

It will be observed that the two specific embodiments using C-MOS technology described above do not exhibit the current faults of dynamic C-MOS circuits, namely charge injection and switching noise.

As regards charge injection, this problem arises solely when the circuit functions simultaneously in several regions, and for example in the charge and voltage regions or in the charge and current regions. The C-MOS networks according to the present invention function solely in the charge region, and hence the problem does not exist.

Furthermore, conventionally, the switching noise originates from crosstalk between signals, and raises particularly critical difficulties in circuits for which the output signals are to be constantly sampled. However, in the circuits of the present invention, the new voltages at the nodes can be sampled by halting the clock signals S1 and S2. In other words, the iteration phases and the sampling phases (application and tapping off of the voltages) take place alternately. There is therefore no troublesome switching noise.

FIG. 6 illustrates the response of a prototype circuit produced according to the present invention. A circuit of 48×48 pixels has been produced with C-MOS technology, the light sensors being produced in the form of C-MOS photodiodes integrated with the circuit. The original and post-convolution images have been read with an analog scanner in current mode. A current/voltage converter connected to the output of the scanner has converted the information into an analog voltage V applied to an oscilloscope, which has restored that which is shown in FIG. 6.

Several responses (curves R1 to R4) can be observed in this figure, each corresponding to a different number of iterations (no iteration for curve R1). One of the clock signals S1 is also observed.

FIG. 6 confirms the expected result, namely the obtaining of a quasi-Gaussian response once the number of iterations becomes sufficient, with a variance which grows progressively.

Finally, it will be observed that capacitive convolvers according to the present invention, owing to their recursivity, make it possible to avoid any spectral aliasing phenomenon observed in certain embodiments of the prior art and related to the use of a convolution kernel with small dimensions.

The present invention finds application in numerous fields such as the smoothing of images and the elimination of noise, the detection of contours and of motion.

Of course, it is not limited to the embodiments described and illustrated, and those skilled in the art will be able to devise any variant or modification in accordance with the spirit thereof.

We claim:

1. Process for performing recursive especially two-dimensional convolution operations of Gaussian type on a set of pixels of an image, each pixel being represented by an electrical voltage, where the process comprises the following steps:

a) a plurality of electrical voltages representing image pixels are applied to the terminals of a plurality of first capacitors (Cd), first terminals of which are connected to a reference potential and second terminals of which constitute a plurality of nodes (N(i,j)) of a network and are electrically insulated from one another, b) the nodes which are immediately adjacent in the direction or directions of the network are connected together for a predetermined duration, via second, uncharged, capacitors (Cb), c) the nodes of the network are insulated from one another anew and the second capacitors are discharged by short-circuiting together the terminals of each second capacitor, d) steps b) and c) are repeated, and e) the new electrical voltages which are present at the nodes of the network and are representative of the pixels of a convolved image are read out.

2. Process according to claim 1, characterized in that steps b) and c) are performed by applying control pulses to switching means (I) connected on the one hand to the terminals of each second capacitor (Cb) and on the other hand, selectively, either to a second terminal of a first associated capacitor (Cd) or to a short-circuiting link (L) associated with the second relevant capacitor.

3. Device for performing recursive convolution of images, especially two-dimensional convolution operations of Gaussian type on a set of image pixels represented by voltages, the device comprising:

a network of first capacitors (Cd), a first terminal of which is connected to a common reference potential and a second terminal of which is able to receive an electrical voltage representative of an image pixel, a set of second capacitors (Cb) respectively associated with each adjacent pair, according to the direction or directions of the network, of first capacitors, controlled interrupter means (Q1, Q2; Q1, Q1', Q2, Q2') capable, for a first predetermined period, of joining up the terminals of each second capacitor (Cb) to the second terminals of the associated pair of first capacitors (Cd) and, for a second predetermined period following on from the first, of insulating the said second terminals from the associated pair of first capacitors and of short-circuiting together the terminals of each second capacitor (Cb).

4. Device according to claim 3, characterized in that the first capacitors are constituted by the junction capacitance of photodiodes, the said photodiodes being able to generate the said electrical voltages representative of the image pixels in response to the receiving of photons constituting the said image.

5. Device according to either of claims 3 or 4, characterized in that the controlled interrupter means comprise first controlled interrupters (Q1, Q1') each connected in series with a second associated capacitor and second controlled interrupters (Q2, Q2') each connected in parallel with a second associated capacitor.

6. Device according to claim 5, characterized in that there is furthermore provision for pulse generating means for producing first pulses for closing the first interrupters (Q1, Q1') for the said first time periods and for producing second pulses for closing the second interrupters (Q2, Q2') for the said second time periods.

7. Device according to either of claim 5, characterized in that the first and second capacitors and the first and second interrupters are produced with C-MOS technology on the same semiconductor substrate.

8. A device according to claim 6, wherein the first and second capacitors and the first and second interrupters are produced with CMOS technology on the same semiconductor substrate.

* * * * *

UNITED STATES PATENT AND TRADEMARK OFFICE
CERTIFICATE OF CORRECTION

PATENT NO. : 5, 521, 857
DATED : May 28, 1996
INVENTOR(S) : Yang Ni and Francis Devos It is certified that errors appear in the above-identified patent and that said Letters Patent is hereby corrected as shown below:

In column 8, claim 7 at line 42, please delete " either of ".

Signed and Sealed this

Twenty-fourth Day of September, 1996

Attest:

BRUCE LEHMAN

Attesting Officer          Commissioner of Patents and Trademarks